(12) United States Patent
Ejiri et al.

(10) Patent No.: US 6,479,131 B1
(45) Date of Patent: *Nov. 12, 2002

(54) MAGNETIC RECORDING MEDIUM

(75) Inventors: Kiyomi Ejiri, Kanagawa (JP); Koji Naoe, Kanagawa (JP); Masahiko Mori, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/596,345

(22) Filed: Jun. 19, 2000

(30) Foreign Application Priority Data

Jun. 21, 1999 (JP) ............................. 11-173888

(51) Int. Cl.⁷ ............................... G11B 5/733
(52) U.S. Cl. .................... 428/141; 428/213; 428/323; 428/336; 428/402; 428/694 BS; 428/694 BN; 428/694 BR; 428/694 BA
(58) Field of Search ................ 428/332, 402, 428/694 BS, 694 BN, 900, 141, 213, 323, 694 BR, 694 BA, 336

(56) References Cited

U.S. PATENT DOCUMENTS

| | | | |
|---|---|---|---|
| 4,828,779 A | | 5/1989 | Hiraki et al. |
| 5,447,782 A | | 9/1995 | Inaba et al. |
| 5,489,466 A | | 2/1996 | Inaba et al. |
| 5,496,607 A | * | 3/1996 | Inaba et al. ............ 428/65.3 |
| 5,540,975 A | * | 7/1996 | Masaki .................. 428/141 |
| 5,612,122 A | | 3/1997 | Tsukamoto et al. |
| 5,637,390 A | * | 6/1997 | Isobe et al. ............. 428/323 |
| 6,136,410 A | * | 10/2000 | Okamoto et al. ........ 428/141 |
| 6,372,325 B1 | | 4/2002 | Ejiri et al. |

FOREIGN PATENT DOCUMENTS

| | | |
|---|---|---|
| JP | 58-56228 A | 4/1983 |
| JP | 60-238179 A | 11/1985 |
| JP | 63-88080 A | 4/1988 |
| JP | 63-187418 A | 8/1988 |
| JP | 63-191315 A | 8/1988 |
| JP | 64-79274 A | 3/1989 |
| JP | 1-106338 A | 4/1989 |
| JP | 1-236968 A | 9/1989 |
| JP | 2-17971 A | 1/1990 |
| JP | 2-174965 A | 7/1990 |
| JP | 2-265672 A | 10/1990 |
| JP | 3-8471 A | 1/1991 |
| JP | 2571351 A | 10/1996 |
| JP | 2634792 A | 11/1996 |

* cited by examiner

Primary Examiner—Stevan A. Resan
Assistant Examiner—Kevin M. Bernatz
(74) Attorney, Agent, or Firm—Stroock & Stroock & Lavan LLP

(57) ABSTRACT

Disclosed is a magnetic recording medium exhibiting a high C/N ratio in high-density magnetic recording. The magnetic recording medium has, on a flexible nonmagnetic support, at least a nonmagnetic layer containing a nonmagnetic powder and a binder and a magnetic layer containing a ferromagnetic powder and a binder on the nonmagnetic layer, where the magnetic layer has an average thickness d in the range of from 0.01 to 0.3 µm, said nonmagnetic powder has an acicular shape, and the ratio of a mean length L of the major axis of the nonmagnetic powder to an average thickness D of said nonmagnetic layer satisfies the relationship of $1/10 \leq L/D \leq 2$.

17 Claims, No Drawings

MAGNETIC RECORDING MEDIUM

BACKGROUND OF THE INVENTION

1. Field of the Invention

This invention relates to a magnetic recording medium exhibiting a high output and a good C/N ratio under high-density recording.

2. Description of Related Art

In recent years, a recording wavelength tends to be shorter along with high densification, and if the magnetic layer is thick, the output tends to be lowered, thereby raising problems in a self-demagnetization loss during recording. Therefore, a magnetic layer is tried to be thinner, but the influence of a nonmagnetic support may easily appear on the surface of the magnetic layer when the magnetic layer having a thickness equal to or less than 2 µm is directly applied to the support, and a deteriorating tendency in electromagnetic characteristics and dropouts are seen.

To solve such problems, there has been proposed a method for forming a thin thickness magnetic layer and a nonmagnetic layer under the magnetic layer, on a nonmagnetic support, by using a simultaneous multilayer coating technique as well as a concentrated coating liquid for the magnetic layer as disclosed in Japanese Unexamined Patent Publication (KOKAI) Showa No.63-191,315 and Japanese Unexamined Patent Publication (KOKAI) Showa No.63-187,418, thereby obtaining a magnetic recording medium having an improved electromagnetic characteristics. In order to smooth a surface of a magnetic layer to further improve a recording density, it is known that an acicular nonmagnetic powder is used in a nonmagnetic lower layer. However, in order to satisfy the demands that a track width is narrowed and noises are decreased, the smoothing of the surface and orientation improvement of magnetic particles become necessary.

SUMMARY OF THE INVENTION

It is an object of the present invention to provide a magnetic recording medium exhibiting a high C/N ratio in high-density magnetic recording.

The inventors have diligently researched surface property improvements of a magnetic layer and orientation improvements of magnetic materials in order to provide a magnetic recording medium exhibiting high C/N ratio in high-density magnetic recording.

That is, the present invention relates to a magnetic recording medium comprising, on a flexible nonmagnetic support, at least a nonmagnetic layer containing a nonmagnetic powder and a binder (also referred to a lower layer or a nonmagnetic lower layer hereinafter) and a magnetic layer containing a ferromagnetic powder and a binder (also referred to a magnetic upper layer hereinafter) on said nonmagnetic layer, characterized in that said magnetic layer has an average thickness in the range of from 0.01 to 0.3 µm, said nonmagnetic powder has an acicular shape, and the ratio of a mean length L of the major axis of said nonmagnetic powder to an average thickness D of said nonmagnetic layer satisfies the relationship of $\frac{1}{10} \leq L/D \leq 2$.

DESCRIPTION OF PREFERRED EMBODIMENTS

In the magnetic recording medium of the present invention, the following embodiments are preferred;

(1) a magnetic recording medium wherein said nonmagnetic layer has a thickness of less than 0.5 µm;

(2) a magnetic recording medium wherein said nonmagnetic powder has a mean length of the major axis equal to or less than 0.2 µm and an acicular ratio in the range of from 2 to 20;

(3) a magnetic recording medium wherein said nonmagnetic layer contains granulated particles which has an average primary particle size equal to or less than 50 nm, and a content ratio of said granulated particle to the acicular nonmagnetic powder is in the range of from.5:95 to 40:60;

(4) a magnetic recording medium wherein said granulated particles are carbon black which has an average primary particle size equal to or less than 30 nm and an oil absorption amount equal to or less than 200 ml/100 g;

(5) a magnetic recording medium wherein one of the surfaces of the flexible nonmagnetic support, on which a nonmagnetic layer and a magnetic layer are formed, has a power spectrum density of roughness (abbreviated PSD hereinafter) equal to or less than 0.5 $nm^2$ in the wavelength of from 1 to 5 µm according to the surface roughness spectrum measured with the atomic force a microscope (AFM) and PSD in the range of from 0.02 to 0.5 $nm^2$ in the wavelength of from 0.5 µm or higher to less than 1 µm.

MODE FOR CARRYING OUT OF THE INVENTION

[Magnetic Layer]

A magnetic layer is also referred to as a magnetic upper layer in this specification.

In the magnetic recording medium of the invention, the thickness of the magnetic upper layer ranges from 0.01 to 0.3 µm. By setting the thickness of the magnetic upper layer in such range, C/N ratio :and resolution property of digital recording can be improved. In the case that such a very thin magnetic layer is coated, in particular, by simultaneous multilayer coating technique or wet-on-wet coating method, the orientation state of magnetic powder and the surface roughness of the magnetic layer are largely influenced by the lower layer. It was found that the orientations and the surface properties can be improved by the fact that an acicular nonmagnetic powder is used in the nonmagnetic lower layer as well as the length of the major axis of the acicular nonmagnetic powder is appropriately selected in view of the thickness of the lower layer, that is, the ratio of a mean length L of the major axis of the nonmagnetic powder to an average thickness D of the nonmagnetic layer satisfies the relationship of $\frac{1}{10} \leq L/D \leq 2$. This is because when a length of the major axis of the nonmagnetic powder is in an appropriate range in view of the thickness of the lower layer, a degree of freedom in the thickness direction of major axis is lowered; thereby the nonmagnetic powder is flatly aligned in the layer. This phenomenon becomes remarkable as the thickness of the lower layer becomes thin.

When the thickness of the lower layer becomes thin, the acicular particles easily and deeply incline and voids between the acicular particles decrease and a molding effect during calendering tends to be smaller, while the effects mentioned above become remarkable. In such a case, it is preferable that a granulated powder having an average primary particle size equal to or less than 50 nm is mixed with said acicular nonmagnetic powder at the specific ratio. It is because the granulated particles enter between the acicular particles, and thus appropriate voids are formed. Desirable effects are gained by using the granulated particles in the mixing ratio mentioned above. In particular, carbon black having an average primary particle size equal to or less than 30 nm and an oil absorption amount equal to or less than 200 ml/100 g is preferably used as the granulated particles mentioned above. Because this type of carbon black has appropriate softness. Mixing carbon black in the lower layer is disclosed in U.S. Pat. No. 5,612,122. However, the oil absorption amount of the carbon black described in this patent is 300 ml/100 g, which is larger than the range described above as a preferable range in the invention. The carbon black having a preferable oil absorption amount in the invention is preferable because of its better dispersibility.

When the magnetic layer in the magnetic recording medium of the invention is thin, surface properties of the nonmagnetic support are important and the effect mentioned above becomes significant by controlling a roughness in the specific wavelength as mentioned below.

It is appropriate in the magnetic medium of the present invention that the mean value d of the thickness of the magnetic layer is in the range of from 0.01 to 0.3 $\mu$m, preferably from 0.01 to 0.2 $\mu$m, more preferably from 0.01 to 0.1 $\mu$m, further more preferably from 0.02 to 0.09 $\mu$m, the most preferably from 0.03 to 0.07 $\mu$m. The object of the invention is accomplished with either single or multiple magnetic layers.

In the case of multi-magnetic layers, the technique described in U.S. Pat. No. 5,447,782 can be applied. Because such a thin magnetic layer of the invention results in the saturation recording state, it is desirable to have no thickness fluctuation of the magnetic layer. However, if the relationship between the standard deviation $\sigma$ in the thickness of the magnetic layer and d is $\sigma/d \leq 0.5$, the thickness fluctuation of the magnetic layer is practically allowable. Moreover, $\sigma/d$ is preferable equal to or less than 0.3.

As a specific means to decrease $\sigma$, for example, (1) a nonmagnetic lower layer coating liquid is made to be thixotropic, (2) an acicular nonmagnetic powder is used in a lower layer, (3) wet-on-dry method is used in which a magnetic upper layer is coated after coating and drying a nonmagnetic lower layer, or the else.

The residual magnetization amount of the magnetic layer is appropriate from 0.0005 to 0.005 emu/cm$^2$. This residual magnetization amount is accordingly optimized by recording and reproducing methods. There are various methods for setting the residual magnetization amount to the above-mentioned range. For instance, when the medium is reproduced with an inductive head, the residual magnetization amount can be set as to be larger within the range mentioned above. From demands for O/W, when the magnetic layer is set as to be thinner (for example, equal to or less than 0.1 $\mu$m), it is preferable to use an alloy powder having a large as (from 140 to 160 emu) as the magnetic powder.

On the other hand, when reproducing is made with an MR head, it is appropriate to set the smaller residual magnetization amount within the mentioned range at the same time with an increase in the number of particles. In this case, it is appropriate to enhance the filling density as much as possible by using a magnetic powder having $\sigma$ s of from 50 to 130 emu/g, by decreasing a binder amount in the upper/lower layers or the else.

For example, an alloy powder having $\sigma$ s of from 100 to 160 emu/g, or hexagonal ferrite, magnetite or Co-ferrite having $\sigma$s of from 50 emu/g to 80 emu/g can be used as a magnetic powder in the magnetic layer of the invention.

Because the suitable coercive force Hc of the magnetic layer is from 1500 to 4000 Oe, preferably from 1800 to 3500 Oe, more preferably from 2000 to 3000 Oe, said magnetic powder preferably has the same Hc. The magnetic particle size is preferably small within the range in which the influence of the heat fluctuation does not appear, but independent from a reproducing head.

In the case of an acicular particle, practically, it is appropriate that the mean length of the major axis is in the range of from 0.05 to 0.2 $\mu$m and a diameter of the minor axis is in the range of from 0.01 to 0.025 $\mu$m. In the case of hexagonal ferrite, it is appropriate that the plate diameter is in the range of from 0.01 to 0.2 $\mu$m and the thickness is in the range of from 0.001 to 0.1 $\mu$m. However, particles smaller than the above-mentioned range may be used if such smaller particles are provided due to the development of techniques.

The magnetic powder may be contain atoms, other than the prescribed atoms, such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, or the like. Al, Si, Ta, Y, or the like can be coated or solidly solved on the surface to improve the thermal stability. In particular, Co, Sm, Nd or the like can be added from 5% to 40% by weight to Fe so as to enhance Hc. Before dispersion, these magnetic powders may be pretreated with, for example, a dispersant, a lubricant, a surfactant, an antistatic agent or the like.

As a binder used in the magnetic upper layer, publicly known binders, for example, disclosed in U.S. Pat. No. 5,496,607 and Japanese Patent No.2,571,351 can be used. These binders preferably contain functional groups which promote the absorption with the magnetic powder ($SO_3M$, $PO_3M$, or the like), moreover, an epoxy group is also preferably contained . The molecular weight is from 10,000 to 100,000, preferably from 20,000 to 60,000. The amount to be used is from 5 to 25 parts by weight with respect to 100 parts by the weight of the magnetic powder, preferably from 5 to 20 parts, more preferably from 5 to 15 parts.

As a binder used in the magnetic layer, publicly known thermoplastic resin, thermosetting resin, reactive resin or the mixture thereof can be used. As the thermoplastic resin, the resin which has a glass transition temperature from −100 to 150° C., a number average molecular weight from 1,000 to 200,000, preferably from 10,000 to 100,000 and a degree of polymerization about from 50 to 1,000 is appropriate. As such thermoplastic resins, polymers and copolymers containing as a unit, vinyl chloride, vinyl acetate, vinyl alcohol, maleic acid, acrylic acid, acrylic acid ester, vinylidine chloride, acrylonitrile, methacrylic acid, methacrylic acid ester, styrene, butadiene, ethylene, vinyl butyral, vinyl acetal, vinyl eter or the like; polyurethane resins and various kinds of rubber based resin can be exemplified. Moreover, as the thermosetting resins and the reactive resins, phenol resins, epoxy resins, polyurethane resins, urea resins, melamine resins, alkyd resins, acryl based reactive resins, formaldehyde resins, silicone resins, epoxy-polyamide resins, a mixture of polyester resin and isocyanate prepolymer, a mixture of polyester polyol and polyisosyanate, a mixture of polyurethane and polyisocyanate, or the like can be exemplified.

The details about these resins are described in "Plastic Handbook" published by Asakura Shoten. Moreover, publicly known electron radiation curing type resins can be used in the nonmagnetic layer and the magnetic layer. The resins mentioned above can be used alone or in combination. As the preferred resins, a combination of polyurethane resins and at least one resin selected from vinyl chloride resins, vinyl chloride-vinyl acetate resins, vinyl chloride-vinyl acetate-vinyl alcohol resins and vinyl chloride-vinyl acetate-maleic anhydride copolymers, or these resins further combined with polyisocyanate can be exemplified. As the structure of the polyurethane resin, publicly known resins such as polyester-polyurethane, polyether-polyurethane, polyether-polyester-polyurethane, polycarbonate-polyurethane, polyester-polycarbonate-polyurethane, polycaproractone-polyurethane or the like can be exemplified. With respect to all binders shown here, at least a polar group selected from —COOM, —SO$_3$M, —OSO$_3$M, —P=O(OM)$_2$, —O—P=O(OM)$_2$ (where M indicates an hydrogen atom or an alkali metal base), —OH, —NR$_2$, =N$^+$R$_3$ (where R indicates an hydrocarbon group), an epoxy group, —SH, —CN or the like, introduced through copolymerization or addition reaction is preferably used, if necessary, to obtain the further excellent dispersibility and the durability. The amount of such polar groups is preferably from $10^{-1}$ to $10^{-8}$ mol/g, more preferably from $10^{-2}$ to $10^{-6}$ mol/g.

Publicly known abrasives, such as α-alumina and Cr$_2$O$_3$ and so on, can be contained in the magnetic layer. The average particle size is preferably from ⅓ or higher to fifth or less of the thickness of the magnetic layer in wet-on-wet coating, and preferably from ⅓ or higher to twice or less of the thickness of the magnetic layer in wet-on-dry coating. Noises and dropouts are caused by too large average particle size of the abrasives. In particular, micro particles are preferable in wet-on-dry coating because abrasives tend to form projections. Known techniques can be used about pH value of the abrasives and the surface treatment. Other than these, solid lubricants (carbon having a particle diameter equal to or higher than 30 μm) and liquid lubricants such as fatty acids and fatty acid esters can be added in the magnetic layer.

[Nonmagnetic Layer]

In this specification, a nonmagnetic layer is also referred to as a lower layer or a nonmagnetic lower layer. A nonmagnetic powder used as a main component in a nonmagnetic lower layer has an acicular shape. Moreover, it is appropriate that the length L of the major axis of the nonmagnetic powder with respect to the thickness D of the lower layer is $1/10 \leq L/D \leq 2$, preferably $1/8 \leq L/D \leq 1.5$, more preferably $1/5 \leq L/D \leq 1$. It is appropriate that the length of the major axis of the nonmagnetic powder is equal to or less than 0.2 μm, preferably equal to or less than 0.15 μm, more preferably equal to or less than 0.1 μm.

The acicular ratio of the nonmagnetic powder is from 2 to 20, preferably from 3 to 10. The particular preferred nonmagnetic powder in the present invention is acicular metal oxides having pH value equal to or higher than 5. These exhibit good dispersibility and provide a coating film with a strong mechanical strength because of their high adsorbing properties to functional groups.

Other preferred embodiments of the nonmagnetic powder is a powder in which the oil absorption amount utilizing DBP is from 5 to 100 ml/100 g, preferably from 10 to 80 ml/100 g, more preferably from 20 to 60 ml/100 g. It preferably has a specific gravity of from 1 to 12, preferably from 3 to 6. The ignition loss is preferably equal to or less than 20% by weight.

The nonmagnetic powder used in the invention mentioned above preferably has the Mohs' scale of hardness equal to or higher than 4. The roughness factor of the powder surface is preferably in the range of from 0.8 to 1.5, more preferably from 0.9 to 1.2. The stearic acid (SA) absorption amount is from 1 to 20 μmol/m$^2$, more preferably from 2 to 15 μmol/m$^2$. The wetting heat to water at 25° C. of the nonmagnetic powder of the lower layer is preferably in the range of from 200 erg/cm$^2$ to 600 erg/cm$^2$. Also, a solvent having the wetting heat in this range can be used. It is appropriate that the water molecular amount of the surface at 100 to 400° C. is in the range of from 1 to 10 pieces /100 Å.

The pH at the isoelectric point in water is preferably in the range of from 5 to 10.

The surface of the nonmagnetic powder is preferably subjected to surface treatment to form at least a part of the surface covered with Al$_2$O$_3$, SiO$_2$, TiO$_2$, ZrO$_2$, SnO$_2$, Sb$_2$O$_3$ or ZnO. The surface treatment resulting in good dispersibility is one covered with Al$_2$O$_3$, SiO$_2$, TiO$_2$ or ZrO$_2$. These may be used in combination, or can be used alone. The surface treatment layer formed by co-precipitation may be used in view of the purposes. The treatment may be the treatment with alumina followed by the treatment with silica and vice versa. Moreover, the surface treatment layer may be a porous layer according to the object, but it is preferably homogeneous and dense, in general. As these acicular powder, oxides, such as TiO$_2$, hematite, α-alumina, γ-alumina, ZrO$_2$, CeO$_2$, Cr$_2$O$_3$, SiO$_2$ or the like, and nonmagnetic metals are exemplified.

It is appropriate that the major axis of acicular nonmagnetic powder spreading in the lower layer inclines in the angle equal to or less than 35 degrees, preferably equal to or less than 30 degrees, as an average, against a nonmagnetic support plane. The angle of the acicular nonmagnetic powder contained in the lower layer can be determined based on photographs, which can be obtained by observation and photographing of the sample cross-sectionally cutting piece along a machine direction with a transmission electron microscope and by imaging process.

For dispersing an acicular nonmagnetic powder at the predetermined angle in the nonmagnetic layer, the following methods can be applied: a method in which a lower layer is formed by coating many times thin layers (for example, at the thickness of equal to or less than 3 times the minor axis length), and a method in which a lower layer alone or a lower layer and a magnetic layer are coated followed by a smoothing process effected by a smooth rod bar or the like to add a sharing force along the support plane. Provided that the latter smoothing process is preferable because an acicular nonmagnetic powder can be orientated efficiently.

Moreover, an acicular nonmagnetic powder is preferably bundled aggregates consisting of bundles of three or more particles. However, a powder not containing aggregates consisting of 100 or more bundled particles is desirable because such aggregates may cause dropout. The following method is mentioned as a method for formation of the aggregates consisting of bundled three or more particles. The acicular nonmagnetic powder is subjected to a densificating or consolidating process, or kneaded by a kneader or the like, thereby so-called aggregation is generated, and then an aggregation structure is destroyed to some extent by beads having a high specific gravity, such as ZrO$_2$ and steel, thereafter, aggregates consisting of 100 or more particles are removed by a filter, so that a coating liquid is produced.

It is preferable that granulated particles having the average primary particle size equal to or less than 50 nm are mixed in the range of from 5:95 to 40:60, preferably from 10:90 to 30:70 with respect to the acicular powder in the lower layer. As these granulated powders, oxides, such as TiO$_2$, hematite, alumina, ZrO$_2$, CeO$_2$, Cr$_2$O$_3$, SiO$_2$ or the like, and nonmagnetic metals, organic resin filler, carbon black or the like can be exemplified.

As the above granulated powder, carbon black which has the average primary particle size equal to or less than 30 nm, preferably equal to or less than 20 nm and the oil absorption amount equal to or less than 200 ml/g, preferably equal to or less than 150 ml/g is particular preferred.

Magnetic powder can be mixed in the lower layer for the purpose of adjusting thixotropic property of the coating liquid therefor in a suitable range and so on. In this case, the thin layer effect would be hurt because the layer substantially becomes thick if magnetization of the mixed magnetic material contributes to recording and reproducing. From this viewpoint, the magnetic material, which has a sufficiently high Hc (equal to or higher than 80% with respect to that of the upper layer) and is hardly magnetized can be added in the amount equal to or less than 30% by volume of the lower layer. Alternatively, a soft magnetic powder with little residual magnetization can be added to the lower layer.

A binder used in the lower layer may be the same as those used in the magnetic upper layer, more preferably those containing functional groups capable of improving the dispersibility as mentioned above. The molecular weight of the binder is from 20,000to 50,000, preferably from 30,000to 50,000. The calender molding effect may be deteriorated if the molecular weight is too large. It, is more effective if the nonmagnetic powder is subjected to surface treatment with alumina or aromatic phosphorus compounds improving the dispersibility.

In detail, binders described in U.S. Pat. No. 5,489,466 and Japanese Patent No. 2,634792 can be referred.

[Common to Magnetic Layer and Nonmagnetic Layer]

As a binder in the upper layer and the lower layer of the invention, the following polyisocyanate may be used.

Isocyanates, such as tolylene diisocyanate, 4,4'-diphenylmethanediisosyanate, hexamethylenediisocyanate, xylylene diisosyanate,: naphtylene-1,5-diisosyanate, o-toluidine diisosyanate, isophorone diisocyanate, triphenylmethane triisocyanate or the like, products of these isocyanates with polyalcohols, or polyisocyanates produced by condensation of isocyanates can be used. These isocyanates are commercially available under the following tradenames; Coronate L, Coronate HL, Coronate 2030, Coronate 2031, Millionate MR, and Millionate MTL manufactured by Nippon Polyurethane Co.Ltd.; Takenate D-102, Takenate D-110N, Takenate D-200, and Takenate D-202 manufactured by Takeda Chemical Industries Co.Ltd.; Desmodule L, Desmodule IL, Desmodule N, and Despodule HL manufactured by Sumitomo Bayer Co. Ltd., and so on. For both the nonmagnetic layer and the magnetic layer, these can be used alone, or in combination of two or more by taking advantage of a difference in curing reactivity.

In the upper layer of the invention, carbon black such as furnace black for rubbers, thermal for rubbers, black for coloring, acetylene black or the like can be used. The carbon black preferably has a specific surface area of from 5 to 500 $m^2/g$, a DBP oil absorption amount of from 10 to 400 ml/100 g, a particle diameter of from 5 nm to 300 nm, a pH of from 2 to 10, a moisture content of from 0.1 to 10% by weight and a tap density of from 0.1to 1 g/ml. Specific examples of carbon black for use in the invention include BLACK-PEARLS 2000, 1300, 1000, 900, 800, 700, and VULCAN XC-72manufactured by Cabot Corporation, #80, #60, #55, #50, and #35 manufactured by Asahi Carbon Co. Ltd., #2400B, #2300, #900, #1000, #30, #40, and #10B manufactured by Mitsubishi Chemical Corp., and CONDUCTEX SC, RAVEN 150, 50, 40, and 15 manufactured by Columbia Carbon Co. Ltd. and so on. These carbon black may be used after surface-treated with a dispersant or the like, or grafted with a resin. Carbon black whose surface has been partly graphitized may also be used. Further, before added to a magnetic coating liquid, the carbon black may be dispersed in advance into the binder. The carbon black may be used alone or in combination.

The carbon black is preferably used in an amount of from 0.1 to 30% by weight with respect to the amount of ferromagnetic powder.

The carbon black has functions in the magnetic layer to prevent static buildup, to reduce the friction coefficient, to lessen light-transmittance, or to improve strength for coating. These effects are different depending on kinds of carbon black. Therefore it is, as a matter of course, possible in the present invention to properly use carbon black different in kinds, amount and combination, in view of the purposes, in the magnetic layer and the lower layer depending on the mentioned properties such as particle size, oil absorption amount, electrical conductivity, pH or the like. As for the examples of the carbon black usable in the invention, Carbon Black Binran (Carbon Black Handbook) edited by Carbon Black Association, for example, can be referred.

As the abrasives used in the invention, known materials mostly having 6 or higher on Mohs' scale of hardness can be used alone or in combination; for example, α-alumina having an α-conversion rate equal to or higher than 90%, β-alumina, silicon carbide, chromium oxide, cerium oxide, α-iron oxide, corundum, artificial diamond, silicon nitride, titaniumcarbide, titanium oxide, silicon dioxide, and boronnitride. A composite composed of two or more of these abrasives (e.g., one obtained by surface-treating one abrasive with another) may also be used. Although these abrasives may contain compounds or elements other than the main component in some cases, the same effect is obtainable if the content of the main component is equal to or higher than 90% by weight. The abrasive preferably has a tap density of from 0.3 to 2 g/ml, a moisture content of from 0.1 to 5% by weight, a pH of, from 2 to 11, and a specific surface area of from 1 to 30 $m^2/g$. Although abrasives used in the present invention may have any of an acicular, spherical, or cubical shape, particles having corners on the part of the shape is preferred due to its good abrasive property. Specific examples of the abrasive used in the invention are AKP-20, AKP-30, AKP-50, HIT-50, HIT-55, HIT-60A, HIT-70 and HIT-100 manufactured by Sumitomo Chemical Co. Ltd:., G5, G7and S-1 manufactured by Nippon Chemical Industrial Co. Ltd., and TF-100 and TF-140 made by Toda Kogyo Corp. It is, as a matter of course, possible in the present invention to properly use abrasives different in kinds, amount and combination, in view of the purposes, in the magnetic layer (the upper and lower layer) and nonmagnetic layer. These abrasives may be added into the magnetic paints after dispersing treatment in advance with the binder.

Those having a lubricating effect, an antistatic effect, a dispersing effect, a plasticizing effect or the like can be used as additives in the invention. Examples of such additives include molybdenum disulfide, tungsten graphite disulfide, boronnitride, graphite fluoride, silicone oil, silicones having a polar group or groups, fatty acid modified silicones, fluorine-containing silicones, fluorine-containing alcohols, fluorine-containing esters, polyolefins, polyglycols; alkyl phosphoric esters and their alkali metal salts; alkyl sulfuric esters and their alkali metal salts; polyphenyl ethers; fluorine-containing alkyl sulfuric esters and their alkali metal salts; monobasic fatty acid having a carbon number of 10 to 24 which may contain an unsaturated bond or bonds or may be branched and their metal salts (e.g., Li, Na, K, Cu); or monohydric, dihydric, trihydric, tetrahydric, pentahydric and hexahydric alcohols having a carbon number of 12 to 22 which may contain an unsaturated bond or bonds or may be branched; alkoxy alcohols having a carbon number of 12 to 22; monofatty acid esters, difatty acid esters or trifatty acid esters comprising monobasic fatty acid having a carbon number of 10 to 24 which may contain an unsaturated bond or bonds or may be branched and any one of monohydric, dihydric, trihydric, tetrahydric, pentahydric and hexahydric alcohols having a carbon number of 2 to 12 which may contain an unsaturated bond or bonds or may be branched; fatty acid esters of monoalkyl ethers of alkylene oxide polymerized products; fatty acid amides having a carbon number of 8 to 22; aliphatic amines having a carbon number of 8 to 22; and so on.

Specific examples of such additives include lauric acid, myristic acid, palmitic acid, stearic acid, behenic acid, butyl stearate, oleic acid, linolic acid, linolenic acid, elaidic acid, octyl stearate, amyl stearate, iso-octyl stearate, octyl myristate, butoxyethyl stearate, anhydrosorbitan monostearate, anhydrosorbitan distearate, anhydrosorbitan tristearate, oleyl alcohol, and lauryl alcohol. Also, those can be used such as nonionic surfactants such as alkylene oxide based, glycerin based, glycidol based, or alkylphenolethylene oxide adducts; cationic surfactants such as cyclic amines, ester amides, quaternary ammonium salts, hydantoin derivatives, heterocyclic compounds, phosphoniums or sulfoniums; anionic surfactants containing an acidic group such as carbtoxylic acid, sulfonic acid, phosphoric acid, sulfuric ester group, or phosphoric ester group; and ampholytic surfactants such as amino acids, amino sulfonic acids, sulfuric or phosphoric esters of amino alcohols, or alkylbetaine type.

These surfactants are described in detail in "A Guide to Surfactants" (published by Sangyo Tosho Co. Ltd.). These lubricants, antistatic agents or the like need not be 100% pure, but may contain impurities such as isomers, unreacted substances, side reaction products, degradation products or oxides in addition to the main component. The content of these impurities is preferably 30% or less, and more preferably 10% or less.

These lubricants and surfactants usable in this invention may be different in kinds and amounts between in the magnetic layer and in the nonmagnetic layer according to the purpose. For example, it is conceivable to control bleeding on the surface with use of fatty acids having different melting temperatures between the nonmagnetic layer and the magnetic layer, to control bleeding on the surface with use of esters having different boiling points and polarities, to improve the coating stability by adjusting the surfactant amount, and to improve lubricant effects by increasing the additive amount of lubricants in the nonmagnetic layer. Such designing is not limited to the above examples as a matter of course. Also, all or some of the additives used in the invention may be added at any stage of the manufacturing process for the magnetic paint; for example, they may be mixed with the ferromagnetic powder before a kneading step, added at a kneading step for kneading the ferromagnetic powder, the binder, and a solvent, added at a dispersing step, added after dispersing, or added immediately before coating. The object may be accomplished by coating a part or all of the additives by simultaneous or sequential coating, after the magnetic layer is coated according to the purpose. The lubricants may be coated on the surface of the magnetic layer after calendar processing or making slits depending on the purpose.

Product examples of the lubricants used in the invention include NAA-102, NAA-415, NAA-312, NAA-160, NAA-180, NAA-174, NAA-175, NAA-222, NAA-34., NAA-35, NAA-171, NAA-122, NAA-142, NAA-160, NAA-173K, hydrogenated castor oil fatty acid, NAA-42, NAA-44, Cation SA, Cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-221, Nonion ST-221, Nonion TO-221, Monoguri MB, Nonion DS-60, Anon BF, Anon LG, butyl stearate, butyl laurate, and erucic acid manufactured by NOF Corp.; oleic acid manufactured by Kanto chemical Co. Ltd.; FAL-205 and FAL-123 manufactured by Takemoto Oil and Fat Co. Ltd.; NJLUB LO, NJLUB IPM, and Sansosyzer E4030 manufactured by New Japan Chemical Co. Ltd.; TA-3, KF-96, KF-96L, KF96H, KF410, KF420, KF965, KF54, KF50, KF56, KF907, KF851, X-22-819, X-22-822, KF905; KF700, KF393, KF-857, KF-860, KF-865, X-22-980, KF-101, KF-102, KF-103, X-22-3710, X-22-3715, KF-910, and KF-3935manufactured by Shin-Etsu Chemical Co. Ltd.; Armaid P, Armaid C, and Armoslip CP manufactured by Lion Armour Co.; Duomine TDO manufactured by Lion Corp.; BA-41G manufactured by The Nisshin Oil Mills, Ltd.; Profan 2012E, Newpole PE61, Ionet MS-400, Ionet MO-200, Ionet DL-200, Ionet DS-300, and Ionet DS-1000, or Ionet DO-200 manufactured by Sanyo Chemical Industries, Ltd.

[Flexible Nonmagnetic Support]

As for the thickness structure of the magnetic recording medium of the invention, it is appropriate that a flexible nonmagnetic support has a thickness of from 1 to 100 $\mu$m, preferably from 3 to 80 $\mu$m. It is appropriate that the thickness of the magnetic upper layer is from 0.01 to 0.3 $\mu$m, preferably from 0.02 to 0.2 $\mu$m. An undercoat layer may be provided in order to improve adhesion between the flexible nonmagnetic support and the lower layer.

It is appropriate that the thickness of the lower layer is from 0.01 to 2 $\mu$m, preferably from 0.02 to 0.5 $\mu$m. Moreover, on the side of the nonmagnetic support opposite to the magnetic layer side, a back coating layer may be provided. The thickness of the back coating layer ranges from 0.1 to 2 $\mu$m, preferably from 0.3 to 1.0 $\mu$m. Publicly known layer can be used as these undercoat layers and back coating layers.

As the flexible nonmagnetic support used in the invention, followings can be used such as publicly known films of polyesters such as polyethylene terephthalate or polyethylene naphthalate, polyolefins, cellulose triacetate, polycarbonate, polyamide, polyimide, polyamideimide, polysulfone, aramid, and aromatic polyamide. These supports may be subjected beforehand to corona discharge treatment, plasma treatment, treatment for enhancing adhesion, heat treatments, dust removal or the like.

In order to achieve the object of the invention, such a flexible nonmagnetic support is used as having a PSD equal to or less than 0.5 nm$^2$, preferably equal to or less than 0.4 nm$^2$ more preferably equal to or less than 0.3 nm$^2$ in the wavelength of from 1 to 5 $\mu$m, and a PSD in the range of from 0.02 to 0.5 nm$^2$, preferably from 0.04 to 0.3 nm$^2$ in the wavelength of from 0.5 $\mu$m or higher to less than 1 $\mu$m according to the surface roughness spectrum measured with AFM. The configuration of the surface roughness can be freely controlled by the size and the amount of the fillers added to the support or coating a binder dispersed with a filler. Examples of such a filler include oxides or carbonates of Ca, Si and Ti, as well as organic micro powders of acrylic based or the like.

The nonmagnetic support used in the invention has, in the case of a tape, the Young's modulus in the MD direction of from 400 to 1500 kg/mm$^2$, preferably from 500 to 1300 kg/mm$^2$, the Young's modulus in the TD direction of from 500 to 2000 kg/mm$^2$, preferably from 700 to 1800 kg/mm$^2$, and the TD/MD ratio of from 1/1 to 1/5, preferably from 1/1 to 1/3.

The thermal shrinkage of the support in the tape running direction and in the tape width direction at 100° C. for 30 minutes is preferably equal to or less than 3%, more preferably equal to or less than 1.5%, and the thermal shrinkage at 80° C. for 30 minutes is preferably equal to or less than 1%, more preferably equal to or less than 0.5%. It is preferable that the break strength in the both directions is preferably from 5 to 100 kg/mm$^2$.

[Manufacturing Method of a Magnetic Recording Medium]

The magnetic recording medium of the invention can be manufactured by coating and drying a paint for forming each layers. The process for producing the paints includes at least a kneading step, a dispersing step, and a mixing step to be carried out, if necessary, before or after these steps. The individual step may be performed separately at two or more stages. All of the starting materials to be used in the invention, including the ferromagnetic powder, binders, carbon black, abrasives, antistatic agents, lubricants, solvents and so on, may be added at the beginning of or during any of the steps. Moreover, the individual material may be divided and added in two or more steps; for example, polyurethane may be divided and added in the kneading step, the dispersing step, and the mixing step for viscosity adjustment after dispersing.

As the organic solvents used in the manufacturing method of the magnetic recording medium of the invention, those can be used at the optional ratio, such as ketones such as acetone, methyl ethyl ketone, methyl isobutyl ketone, diisobutyl ketone, cyclohexanone, isophorone, or tetrahydrofuran; alcohols such as methanol, ethanol, propanol, butanol, isobutyl alcohol, isopropyl alcohol, ormethylcyclohexanol; ethers such as methyl acetate, butyl acetate, isobutyl acetate, isopropyl acetate, ethyl lactate or glycol acetate; glycol ethers such as glycol dimethyl ether, glycol monoethyl ether, or dioxane; aromatic hydrocarbons such as benzene, toluene, xylene, cresol or chlorobenzene; chlorinated hydrocarbons such as methylene chloride, ethylene chloride, carbon tetrachloride, chloroform, ethylene chlorohydrin, or dichlorobenzene; N,N-dimethylformamide; hexane or the like. These organic solvents need not be 100% pure, but may contain impurities such as isomers, unreacted substances, side reaction products, degradation products, oxides or moisture, in addition to the main component. The content of those impurities is preferably equal to or less than 30%, and more preferably equal to or less than 10%. In the invention, the same kinds of organic solvents are desirably used in the magnetic layer and the nonmagnetic layer, and then those adding amounts can be changed. It is adequate to raise the stability of coating, in. the nonmagnetic layer, using a solvent having a high surface tension, (e.g., cyclohexane, dioxane or the like), for forming the nonmagnetic layer. More specifically, it is adequate to design that the arithmetic mean value of the magnetic layer solvent compositions is not less than the arithmetic mean value of the nonmagnetic layer solvent compositions. To improve the dispersing property, a solvent having a strong polarity to some extent is preferred. It is also preferable that the content of the solvent having permittivity equal to or higher than 15 is equal to or higher than 50% in the solvent compositions. The dissolution parameter is preferably from 8 to 11.

For manufacturing the magnetic recording medium of the invention, conventional publicly known manufacturing techniques can be used as a part of the process as a matter of course, and a magnetic recording medium having a high residual magnetic flux density (Br) can be obtained by using a continuous kneader or a pressure kneader having a strong kneading force in the kneading step. When the continuous kneader or pressure kneader is used, the ferromagnetic powder and all or part of the binder (preferably, equal to or higher than 30% of the entire binder) are kneaded in the range of from 15 to 500 parts by weight with respect to the 100 parts by weight of the ferromagnetic powder. Details of the kneading treatment are set forth in Japanese Unexamined Patent Publication (KOKAI) Heisei No.1-106,338and Japanese Unexamined Patent Publication (KOKAI) Showa No.64-79,274. When a lower nonmagnetic layer liquid is prepared, dispersing media having a high specific gravity may preferably be used, desirably, zirconia beads.

The following method is mentioned as a method for formation of the aggregates consisting of bundled three or more particles as well as for production of the magnetic recording medium of the invention in which the major axis of acicular nonmagnetic powder spreading in the lower layer inclines in the angle equal to or less than 35 degrees, preferably equal to or less than 30 degrees, as an average, against a nonmagnetic support plane. The acicular nonmagnetic powder is subjected to a densificating or consolidating process, or kneaded by a kneader or the like, thereby so-called aggregation is generated, and then an aggregation structure is destroyed to some extent by beads having a high specific gravity, such as $ZrO_2$ and steel, thereafter, aggregates consisting of 100 or more particles are removed by a filter, so that a coating liquid is produced. The coating liquid for forming a nonmagnetic layer containing a nonmagnetic powder and a binder and a coating liquid for forming a magnetic layer containing a ferromagnetic powder and a binder are coated simultaneously or sequentially on a nonmagnetic flexible support, as to form a magnetic layer on the nonmagnetic layer, and then, a smoothing process and magnetic field orientation are done while the coating layer is still in a wet state.

The followings can be proposed as coating apparatuses and methods for producing multilayer magnetic recording media such as that of the present invention.

1. A lower layer is first applied with a coating apparatus commonly used for magnetic paint coating, e.g., a gravure coating, roller coating, blade coating, or extrusion coating apparatus, and an upper layer is then applied, while the lower layer is still in a wet state, by means of a support-pressing extrusion coating apparatus such as those disclosed in Japanese Patent Publication (KOKOKU) Hei;sei No.1-46,186, Japanese Unexamined Patent Publication (KOKAI) Showa No.60-238,179 and Japanese Unexamined Patent Publication (KOKAI) Heisei No.2-265,672.

2. Upper and lower layers are applied almost simultaneously using a single coating head having two built-in slits for passing coating liquid, such as those disclosed in Japanese Unexamined Patent Publication (KOKAI) Showa No.63-88,080, Japanese Unexamined Patent Publication (KOKAI) Heisei No.2-17,971 and Japanese Unexamined Patent Publication (KOKAI) Heisei No.2-265,672.

3. Upper and lower layers are applied almost simultaneously using an extrusion coating apparatus with a backup roller as disclosed in Japanese Unexamined Patent Publication (KOKAI) Heisei No.2-174,965

In order to prevent lowering the electromagnetic characteristics or the like of the magnetic recording medium by aggregation of ferromagnetic particles, shearing may preferably apply to the coating liquid in the coating head by a method such as those disclosed in U.S. Pat. No. 4,828,779 and Japanese Unexamined,Patent Publication (KOKAI) Heisei No.1-236,968. In addition, the viscosity of the coating liquid needs to satisfy the numerical range as specified in Japanese Unexamined Patent Publication (KOKAI)

Heisei No.3-8,471. To obtain the magnetic recording medium of the invention, a strong orientation is required to be made.

It is preferable to concurrently use a solenoid equal to or higher than 1000 G and a Co-Sm magnet equal to or higher than 2000 G in a manner that the same polarities of those above oppose to each other, and furthermore, it is preferable to set a proper drying step in advance to the orientation so that the post-dry orientation characteristics show the highest. When this invention applies to a disc medium, randomizing the orientation is rather required.

Heat-resistant plastic rollers, e.g., epoxy, polyimide, polyamide, or polyimideamide, can be used as rollers for calendering process, or metal rollers by themselves can also be used. It is appropriate that the processing temperature is preferably at equal to or higher than 70° C., more preferably at equal to or higher than 80° C. It is appropriate that the linear pressure is preferably equal to or higher than 200 kg/cm, more preferably equal to or higher than 300 kg/cm. It is respectively appropriate that the coefficient of friction of the surface of the magnetic layer and the opposite surface of the magnetic layer of the magnetic recording medium of the invention is preferably equal to or less than 0.5, more preferably equal to or less than 0.3 with respect to SUS420J, the surface resistivity of those is preferably from $10^4$ to $10^{12}$ ohm/sq, the modulus of elasticity at 0.5% elongation of the magnetic layer is preferably from 100 to 2,000 kg/mm$^2$ in both the running and width directions, the strength at break is preferably from 1 to 30 kg/cm$^2$, the modulus of the magnetic recording medium is preferably from 100 to 1,500 kg/mm$^2$ in both running and longitudinal directions, the residual elongation is preferably equal to or less than 0.5%, and the thermal shrinkage at any temperature of 100° C. or below is preferably equal to or less than 1%, more preferably equal to or less than 0.5%, and the most preferably equal to or less than 0.1%. The glass transition temperature (the temperature at which the loss elastic modulus in a dynamic viscoelasticity measurement at 110 Hz becomes maximum) of the magnetic layer is preferably 50° C. or higher to 120° C. or below, while that of the lower layer is preferably at 0° C. to 100° C. The loss elastic modulus is preferably in the range of from $1 \times 10^8$ to $8 \times 10^9$ dyne/cm$^2$ and the loss tangent is preferably equal to or less than 0.2. If the loss tangent is too large, the adhesion trouble easily occurs.

It is appropriate that the residual solvent contained in the magnetic layer is preferably equal to or less than 100mg/m$^2$, more preferably equal to or less than 10 mg/m$^2$. It is appropriate that the void percentage in the magnetic layer is preferably equal to or less than 30% by volume and more preferably equal to or less than 20% by volume in the both lower and magnetic layers. Although a lower void percentage is preferable for attaining higher output, there are some cases in which a certain degree of void percentage is preferably ensured according to the purposes; for example, in the case of a magnetic recording medium for data recording putting an importance on the repeating use, higher void percentage in most cases bring about better running durability. It is appropriate that the magnetic property of the magnetic recording medium of the invention has, when measured in a magnetic field of 5 KOe, the squareness equal to or higher than 0.70, preferably, equal to or higher than 0.80, more preferably, equal to or higher than 0.90 in the tape running direction.

The squareness in two directions perpendicular to the tape running direction is preferably equal to or less than 80% of the squareness in the running direction. The SFD (Switching Field Distribution) of the magnetic layer is preferably equal to or less than 0.6.

It is appropriate that the surface of the magnetic layer has a power spectrum density of roughness (PSD) measured with an atomic force microscope (AMF) in the wavelength of from 1 to 5 $\mu$m being equal to or less than 0.2 nm$^2$, and the PSD in the wavelength of from 0.5 $\mu$m or higher to less than 1.0 $\mu$m being from 0.02 to 0.1 nm$^2$. Although the PSD is preferably smaller for improving the C/N ratio, it is necessary that the PSD in the wavelength of from 0.5 $\mu$m or higher to less than 1.0 $\mu$m is retained from 0.02 to 0.1 nm$^2$ for improving the running durability.

With the magnetic recording medium of the invention, which has the lower layer and upper magnetic layer, it is easily presumed that the lower layers and the magnetic layers can be different in physical properties according to the purposes. For example, the magnetic layer is made to have a high elastic modulus to improve running durability while the lower layer is made to have a lower elastic modulus than that of the magnetic layer to have better head touching of the magnetic recording medium. Techniques relating to known multilayer magnetic layers can be refer to when designing physical characteristics of two or more magnetic layers. For example, although there are many inventions as disclosed in Japanese Patent Publication (KOKOKU) Showa No. 37-2, 218 and Japanese Unexamined Patent Publication (KOKAI) Showa No. 58-56,228 in which the Hc of the upper magnetic layer is set higher than that of the lower layer, recording is possible for the magnetic layer having further higher Hc by making the magnetic layer thinner as described in the invention.

EXAMPLES

The present invention is explained below in detail by the following examples. The indication of "parts" means "parts by weight" in those examples.

Examples 1–11 and Comparative Examples 1–4

① Nonmagnetic lower layer

| | |
|---|---|
| nonmagnetic powder $\alpha$-Fe$_2$O$_3$ | 80 parts |
| Mean length of major axis | 0.1 $\mu$m |
| BET specific surface area | 48 m$^2$/g |
| pH 8, Fe$_2$O$_3$ content | 90% or higher |
| DBP oil absorption amount | 27–38 ml/100 g |
| Surface covering agent Al$_2$O$_3$ | |
| Carbon black | 20 parts |
| Average primary particle diameter | 16 nm |
| DBP oil absorption amount | 80 ml/100 g |
| pH | 8.0 |
| BET specific surface area | 250 m$^2$/g |
| Volatile content | 1.5% |
| Vinyl chloride copolymer | 10 parts |
| MR-110 manufactured by Nippon Zeon Co. Ltd. | |
| Polyester-polyurethane resin | 5 parts |
| Molecular weight | 35,000 |
| Neopentyl glycol/Caprolactonepolyol/ MDI (4,4'-diphenylmethane- diisocyanate) = 0.9/2.6/1 | |
| Containing $1 \times 10^{-4}$ 4 eq/g of —SO$_3$Na group | |
| Butyl stearate | 1 parts |
| Stearic acid | 1 parts |
| Methyl ethyl ketone | 100 parts |
| Cyclohexanone | 50 parts |
| Toluene | 50 parts |
| ② Magnetic layer | |
| Ferromagnetic metal powder | 100 parts |
| Composition Fe/Co atomic ratio = 80/20 | |
| Hc 2300 Oe, BET specific surface area | 54 m$^2$/g |
| crystallite size | 165 Å, |

-continued

| | |
|---|---|
| Surface covering agent Al$_2$O$_3$ | |
| Particle size (major axis diameter) | 0.1 µm |
| Acicular ratio | 8 |
| σs:150 emu/g | |
| Vinyl chloride based copolymer | 5 parts |
| MR-110 manufactured by Nippon Zeon Co. Ltd. | |
| Polyester-polyurethane resin | 3 parts |
| Neopentyl glycol/Caprolactonepolyol/ MDI (4,4'-diphenylmethane-diisocyanate) = 0.9/2.6/1 | |
| Containing 1 × 10$^{-4}$ eq/g of —SO$_3$Na group | |
| α-alumina (particle size of 0.1 µm) | 5 parts |
| Carbon black (particle size of 0.10 µm) | 0.5 parts |
| Butyl stearate | 1.5 parts |
| Stearic acid | 0.5 parts |
| Methyl ethyl ketone | 90 parts |
| Cyclohexanone | 30 parts |
| Toluene | 60 parts |

The above two paints were dispersed respectively using a sand mill after each component was kneaded in a continuous kneader. Polyisocyanate was added to the obtained dispersing liquids; three parts were added to the coating liquid for the lower layer, and one part was added to the coating liquid for the magnetic layer. A mixed solvent of methyl ethyl ketone and cyclohexanone was added by 40 parts to each liquid, and each liquid was filtered using a filter having a mean pore diameter of 1 µm to prepare respective coating liquids for forming the magnetic layer and lower layer. On a polyethylenenaphthalate support having the thickness of 5.5 µm, a PSD of 0.05, 0.09 and 0.11 nm$^2$ in the wavelength of from 0.5, 1, and 5 µm respectively according to the roughness spectrum with AFM, and the Young's modulus of 600 kg/m$^3$ and 900 kg/m$^3$ in MD and TD directions respectively, the obtained coating liquid for the lower layer was coated in such an amount as to form the dry thickness of 0.3 µm, and immediately after this, the coating liquid for the magnetic layer was coated on the layer in such an amount as to form the thickness of 0.1 µm. These layers were coated by a simultaneous multilayer coating method. While both layers were still in a wet state, the layers were subject to orientation created by a Co—Sm magnet having a 3,000 G magnetic force and a solenoid having a 1500 G magnetic force. After dried, the layers were calendered at temperature of 90° C. bypassing through six nips, each of which comprising a pair of metal rollers to manufacture a magnetic tape, and then slitting it into an 8 mm width, thereby producing an 8 mm videotape.

[Evaluation Method]

(1) C/N ratio was measured in use of a drum tester. The head used was an MIG head having the Bs of 1.2 T, a gap length of 0.22 µm for recording and reproducing uses. The relative velocity of head to medium during recording and reproducing was 10.5 m/sec and a single frequency signal of 21 MHz was recorded and reproducing spectrum was observed with a spectrum analyzer manufactured by Shibasoku Co. Ltd. The C/N ratio was the ratio of the carrier output of 21 MHz to the noise of 19 MHz.

(2) Measurement of Thickness

A sampling tape was cut out in the longitudinal direction with a diamond cutter to form the thickness of about 0.1 µm, and it was observed and taken pictures by a transmission electron microscope having magnification of 100,000 times. Lines were drawn on the magnetic layer surface and the interface of the magnetic layer and the lower layer, and then, measurement was made by the image processor IBAS2 manufactured by Zeiss Co. Ltd. When the measured length was 21 cm, measurements were made from 85 to 300 times, thus calculating a mean value d and a standard deviation σ.

(3) AFM Measurement

A ridge degree measured 70 degree with NanoScope 3 manufactured by Digital Instruments, and a square angle measured 30 µm with the quadrangular pyramid probe made of SiN. Surface roughness was analyzed with frequency to produce a power spectrum (4) Friction Coefficient Under temperature at 21° C. and humidity of 50%, the tape was lapped at a 90 degree angle with a rod of SUS 303 having a roughness of 0.2 S and 2 mm φ, and it was subjected to passing-sweeping movement of 100 passes with a load of 10 g and velocity of 18 mm/sec stroke 10 mm, measuring the maximum friction coefficient.

(5) Ra Measurement

A centerline mean roughness was measured using TOPO-3D by WYKO Co. Ltd.

(6) SQ

SQ was measured at 10 kOe of the external magnetic field using VSM.

TABLE 1

| | | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|
| Average thickness of magnetic layer d | (µm) | 0.05 | 0.1 | 0.1 | 0.05 | 0.03 | 0.05 | 0.05 | 0.05 | 0.05 | 0.05 | 0.05 |
| Average thickness of nonmagnetic layer D | (µm) | 0.3 | 0.45 | 1.2 | 0.7 | 0.2 | 0.3 | 0.3 | 0.3 | 0.3 | 0.3 | 0.3 |
| Nonmagnetic powder | | AH | AH | AH | AH | AH | AH | AH | AH | AH | AH | AH |
| Mean length of major axis L | (µm) | 0.12 | 0.18 | 0.18 | 0.1 | 0.35 | 0.12 | 0.25 | 0.12 | 0.12 | 0.12 | 0.12 |
| Acicular ratio | | 6 | 8 | 8 | 5 | 12 | 6 | 6 | 6 | 6 | 6 | 6 |
| L/D | | 0.4 | 0.4 | 0.15 | 0.14 | 1.75 | 0.4 | 0.83 | 0.4 | 0.4 | 0.4 | 0.4 |
| Granulated particle | | Carbon | Carbon | Carbon | Carbon | Carbon | TiO$_2$ | TiO$_2$ | GH | Carbon | Carbon | |
| Average primary particle size | (nm) | 16 | 16 | 16 | 16 | 16 | 35 | 35 | 20 | 16 | 20 | |
| Oil absorption amount | (ml/100 g) | 80 | 80 | 80 | 80 | 80 | 40 | 40 | 70 | 80 | 495 | |
| Content ratio | | 20:80 | 10:90 | 10:90 | 30:70 | 5:95 | 20:80 | 20:80 | 20:80 | 20:80 | 5:95 | |
| PSD of support (nm$^2$) | 0.05 µm | 0.05 | 0.05 | 0.3 | 0.05 | 0.03 | 0.05 | 0.05 | 0.15 | 0.01 | 0.05 | 0.05 |
| | 1.0 µm | 0.09 | 0.09 | 0.9 | 0.09 | 0.07 | 0.09 | 0.09 | 0.28 | 0.03 | 0.09 | 0.09 |
| | 5.0 µm | 0.12 | 0.12 | 2.5 | 0.12 | 0.12 | 0.12 | 0.12 | 0.35 | 0.07 | 0.12 | 0.12 |

TABLE 1-continued

|  |  | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|
| Ra of support magnetic plane | (nm) | 1.8 | 1.9 | 3.2 | 2.9 | 2.5 | 2.5 | 3.2 | 2.9 | 1.6 | 3.4 | 3 |
| SQ |  | 0.89 | 0.88 | 0.82 | 0.85 | 0.9 | 0.87 | 0.87 | 0.86 | 0.89 | 0.9 | 0.88 |
| Reproduction output | (dB) | 4.8 | 4.5 | 2.1 | 2.6 | 3.1 | 3.9 | 2.8 | 3 | 5.2 | 2.4 | 2.7 |
| CNR | (dB) | 5.2 | 4.6 | 2.4 | 2.9 | 3 | 4.1 | 2.5 | 3.5 | 5 | 2.6 | 2.4 |
| Friction coefficient |  | 0.23 | 0.26 | 0.26 | 0.25 | 0.29 | 0.27 | 0.25 | 0.28 | 0.31 | 0.22 | 0.3 |

AH: Acicular hematite
GH: Granulated hematite
Carbon: Carbon black
(*) Weight ratio of the granulated particle to the nonmagnetic powder

TABLE 2

|  |  | Comp. Ex. 1 | Comp. Ex. 2 | Comp. Ex. 3 | Comp. Ex. 4 |
|---|---|---|---|---|---|
| Average thickness of magnetic layer d | ($\mu$m) | 0.5 | 0.05 | 0.05 | 0.05 |
| Average thickness of nonmagnetic layer D | ($\mu$m) | 2 | 0.3 | 2 | 0.2 |
| Nonmagnetic powder |  | AH | GH | AH | AH |
| Mean length of major axis L | ($\mu$m) | 0.25 | 0.1 | 0.12 | 0.45 |
| Acicular ratio |  | 7.7 | 1 | 6 | 15 |
| L/D |  | 0.125 | — | 0.06 | 2.25 |
| Granulated particle |  | Carbon | Carbon | Carbon | Carbon |
| Average primary particle size | (nm) | 20 | 16 | 16 | 16 |
| Oil absorption amount | (ml/100 g) | 495 | 80 | 80 | 80 |
| Content ratio(*) |  | 3:97 | 20:80 | 20:80 | 20:80 |
| PSD of support | 0.05 $\mu$m | 0.3 | 0.05 | 0.05 | 0.05 |
| (nm$^2$) | 1.0 $\mu$m | 0.9 | 0.09 | 0.09 | 0.09 |
|  | 5.0 $\mu$m | 2.5 | 0.12 | 0.12 | 0.12 |
| Ra of support magnetic plane | (nm) | 5.3 | 5.8 | 4.6 | 6.1 |
| SQ |  | 0.83 | 0.78 | 0.83 | 0.79 |
| Reproduction output | (dB) | 0 | −1.5 | 0.5 | −0.8 |
| CNR | (dB) | 0 | −1.3 | 0.3 | −0.5 |
| Friction coefficient |  | 0.27 | 0.25 | 0.36 | 0.21 |

AH: Acicular hematite
GH: Granulated hematite
Carbon: Carbon black
(*)Weight ratio of the granulated powder to the nonmagnetic powder Explanation of Examples 1–11 and Comparative Examples 1–4

Comparative Example 1 was used as a standard (0 dB) for electromagnetic characteristics. A video tape of Comparative Example 1 was manufactured by the same procedures as those of Sample 1 in U.S. Pat. No. 5,612,122 excepting that a magnetic powder in the magnetic upper layer is different. Whether or not it was effective was judged based on whether the C/N ratio was improved to 3 dB or higher (generally, one digit influence to an error rate with respect to 2 dB,) and on whether the friction coefficient is not over 0.3.

Example 1 was an example of the present invention additionally satisfying all requirements in the preferred embodiments (1) to (5) mentioned above (see pages 2–3). The C/N ratio was improved to 5.2 dB compared with that of Comparative Example 1.

Example 2 was also an example of the present invention additionally satisfying all requirements in the preferred embodiments (1) to (5) mentioned above (see page 2–3). Provided that the thickness of the lower layer was close to the upper limit described in the preferred embodiment (1) and the length of the major axis of the nonmagnetic powder contained in the lower layer was close to the upper limit described in the preferred embodiment (2). The C,/N ratio of 4.8 dB was gained which is slightly inferior than that of Example 1 but is almost equivalent to that of Example 1.

Example 3 was the example in which the average thickness D of the lower layer was relatively thick, thereby the L/D was close to the lower limit of the present invention (claim 1) and the support had the PSD exceeding the range described in the preferred embodiment (5). Due to deterioration of the surface property compared with those of Examples 1 and 2, the C/N ratio was 2.4 dB that was lower than those of these Examples.

Example 4 was the example in which the average thickness of the lower layer D was relatively thick, thereby the L/D was close to the lower limit of the present invention (claim 1) and the mixing ratio of the granulated powder to the lower layer was close to the upper limit described in the preferred embodiment (3). The C/N ratio was 2.9 dB that was lower than those of Examples 1 and 2, as that of Example 3.

Example 5 was the example in which the length of the major length was 0.35 $\mu$m exceeding the range described in the preferred embodiment (3), the mixing ratio of the granulated powder to the lower layer was the lower limit described in the preferred embodiment (3) and the L/D was close to the upper limit of the present invention (claim 1). The calender molding property tended to be lowered and the C/N ratio was low of 3.1 dB.

Example 6 was the same example as Example 1 except for using titanium oxide having the average primary particle size of 35 nm as the granulated powder to the lower layer. The C/N ratio was 4.1 dB that was slightly lower than that of Example 1.

Example 7 was the same example as Example 1 except for using the nonmagnetic powder having the length of the major axis which exceeded the range described in the preferred embodiment (2). The C/N ratio was 2.5 dB, which was slightly lower than that of Example 1.

Example 8 was the same example as Example 1 except for using the granulated hematite having the average primary particle size of 20 nm as the granulated powder to the lower layer. The C/N ratio was 3.5 dB that was slightly lower than that of Example 1.

In Example 6 to Example 8, the C/N ratio was slightly low. This is because the calender molding effect resulting from the granulated powder added, to the lower layer was lower than that from carbon black described in the preferred embodiment (4).

Example 9 was the same example as Example 1 except for using a smooth support having a surface roughness outside of the range described in the preferred embodiment (5). The C/N ratio was high of 5 dB but the friction coefficient was also high.

Example 10 was the example in which the mixing ratio of carbon to the lower layer was equal to the lower limit described in the preferred embodiment (3) and the oil absorption amount of carbon was outside of the range described the preferred embodiment (4). The dispersibility was inferior due to the high oil absorption amount. As a result, the surface property tended to deteriorate and the C/N ratio was low of 2.6 dB.

Example 11 was the same example as Example 1 except that a granulated powder was not mixed to the lower layer. The surface property was inferior because of little calender molding effect and the C/N ratio was low of 2.4 dB.

Comparative Example 2 was the example in which a granulated hematite was used in the lower layer instead of the acicular nonmagnetic powder in the case of Example 1. The C/N ratio was −1.3 dB and the smoothing and orientation improvement due to the acicular powder could not be gained.

Comparative Example 3 was the same example as Example 1 except for having the L/D lower than the lower limit of the present invention (claim 1) The C/N ratio was 0.3 dB and the smoothing and orientation improvement could not be gained.

Comparative Example 4 was the same example as Example 1 except for using a nonmagnetic powder in which the length of the major axis was long and thereby the L/D exceeded the upper limit of the present invention (claim 1). The C/N ratio was −0.5 dB and the irregular of the interface was larger than that of Example 1.

Examples 12–20 and Comparative Examples 5–7

① Nonmagnetic lower layer

| | |
|---|---|
| nonmagnetic powder α-Fe$_2$O$_3$ | 80 parts |
| Mean length of major axis | 0.1 μm |
| BET specific surface area | 48 m$^2$/g |
| pH 8, Fe$_2$O$_3$ content | 90% or higher |
| DBP oil absorption amount | 27–38 ml/100 g |
| Surface covering agent Al$_2$O$_3$ | |
| Carbon black | 20 parts |

-continued

| | |
|---|---|
| Average primary particle diameter | 16 nm |
| DBP oil absorption amount | 80 ml/100 g |
| pH | 8.0 |
| BET specific surface area | 250 m$^2$/g |
| Volatile content | 1.5% |
| Vinyl chloride copolymer | 10 parts |
| MR-110 manufactured by Nippon Zeon Co. Ltd. | |
| Polyester-polyurethane resin | 5 parts |
| Molecular weight | 35,000 |
| Neopentyl glycol/Caprolactonepolyol/ MDI (4,4'-diphenylmethane- diisocyanate) = 0.9/2.6/1 Containing 1 × 10$^{-4}$ eq/g of —SO$_3$Na group | |
| Butyl stearate | 1 parts |
| Stearic acid | 1 parts |
| Methyl ethyl ketone | 100 parts |
| Cyclohexanone | 50 parts |
| Toluene | 50 parts |
| ② Magnetic layer | |
| Ferromagnetic metal micro powder | 100 parts |
| Composition Fe/Co atomic ratio = 80/20 | |
| Hc 2300 Oe, BET specific surface area | 54 m$^2$/g |
| Crystallite size | 165 Å, |
| Surface covering compound Al$_2$O$_3$ | |
| Particle size (major axis diameter) | 0.1 μm |
| Acicular ratio | 8 |
| σs:150 emu/g | |
| Vinyl chloride based copolymer | 5 parts |
| MR-110 manufactured by Nippon Zeon Co. Ltd. | |
| polyester-polyurethane resin | 3 parts |
| Neopentyl glycol/Caprolactonepolyol/ MDI (4,4'-diphenylmethane- diisocyanate) = 0.9/2.6/1 Containing 1 × 10$^{-4}$ eq/g of —SO$_3$Na group | |
| α-alumina (particle size of 0.1 μm) | 5 parts |
| Carbon black (particle size of 0.10 μm) | 0.5 parts |
| Butyl stearate | 1.5 parts |
| Stearic acid | 0.5 parts |
| Methyl ethyl ketone | 90 parts |
| Cyclohexanone | 30 parts |
| Toluene | 60 parts |

The above two paints were dispersed respectively by a ball mill using steel balls for 6 hours after each component was kneaded in a continuous kneader. Polyisocyanate was added to the obtained dispersing liquids; three parts were added to the coating liquid for the lower layer, and one part was added to the coating liquid for the magnetic layer. A mixed solvent of methyl ethyl ketone and cyclohexanone was added by 40 parts to each liquid, and each liquid was filtered using a filter having a mean pore diameter of 1 μm to prepare respective coating liquids for forming the magnetic layer and lower layer. On a polyethylenenaphtalate support having the thickness of 5.5 μm, a PSD of 0.05, 0.09 and 0.11 nm$^2$ in the wavelength of from 0.5, 1, and 5 μm respectively according to the roughness spectrum with AFM, and the Young's modulus of 600 kg/m$^3$ and 900 kg/m$^3$ in MD and TD directions respectively, the obtained coating liquid for the lower layer was coated in such an amount as to form the dry thickness of 0.3 μm, and immediately after this, the coating liquid for the magnetic) layer was coated on the layer in such an amount as to form the thickness of 0.1 μm. These layers were coated by a simultaneous multi layer coating method. While both layers were still in a wet state, the layers were subjected to a smoothing by contacting a stainless plate having a surface roughness Ra of 1.5 nm a coating layer surface and then to orientation created by a Co—Sm magnet having a 3,000 G magnetic force and a solenoid having a 1500 G magnetic force. After dried, the layers were calendered at temperature of 90° C. by passing through six nips, each of which comprising a pair of metal rollers to manufacture a magnetic tape, and then slitting it into an 8 mm width, thereby producing an 8 mm videotape.

[Evaluation method]

(1) CNR(C/N ratio), measurement of thickness, Ra measurement and SQ were obtained as same procedures as those used in Examples 1–11.

(2) Determination of an orientation angle and a bundle structure of an acicular nonmagnetic powder They were read from photographs of cutting pieces. An angle made by a major axis of a primary particle of an acicular nonmagnetic powder against a nonmagnetic support us measured with respect to 500 pieces, and then the average value was calculated to obtain an orientation angle.

TABLE 3

|  |  |  | Ex. 12 | Ex. 13 | Ex. 14 | Ex. 16 | Ex. 17 | Ex. 18 | Ex. 19 | Ex. 20 |
|---|---|---|---|---|---|---|---|---|---|---|
| Thickness | Upper layer | [μm] | 0.05 | 0.05 | 0.05 | 0.03 | 0.05 | 0.05 | 0.05 | 0.05 |
|  | Lower layer D | [μm] | 0.3 | 0.45 | 0.3 | 0.2 | 0.7 | 0.3 | 0.3 | 0.3 |
| Acicular powder of lower layer | Kinds |  | AH | AH | AH | AH | AH | AH | AH | AH |
|  | Length of major axis L | [μm] | 0.12 | 0.18 | 0.12 | 0.12 | 0.35 | 0.18 | 0.18 | 0.12 |
|  | Acicular ratio |  | 6 | 8 | 6 | 6 | 12 | 8 | 8 | 6 |
|  | L/D |  | 0.40 | 0.40 | 0.40 | 0.60 | 0.50 | 0.60 | 0.60 | 0.40 |
|  | Average angle |  | 10 | 15 | 15 | 5 | 29 | 20 | 15 | 8 |
|  | Number of particles constituting a bundle |  | 5 | 10 | 2 | 7 | 18 | 8 | 5 | 2 |
| Powder of lower layer | Kinds |  | Carbon | Carbon | Carbon | Carbon | Carbon | TiO2 | GH |  |
|  | Average particle size | [nm] | 16 | 16 | 16 | 16 | 16 | 35 | 20 |  |
|  | Oil absorption amount | [ml/100 g] | 80 | 80 | 80 | 80 | 80 | 40 | 70 |  |
|  | Content ratio(*) |  | 20:80 | 20:80 | 10:90 | 5:95 | 20:80 | 20:80 | 20:80 |  |
| Prucedure | Smoothig process |  | Used | Used | None | Used | Used | Used | Used | Used |
|  | Kneader |  | Used | Used | Used | Used | Used | Used | Used | Used |
|  | Dispersing time | Time | 6 | 4 | 10 | 6 | 6 | 6 | 6 | 10 |
| Evaluation results | Ra | [nm] | 1.6 | 2.1 | 1.7 | 2 | 3.2 | 2.4 | 2.5 | 2.6 |
|  | SQ |  | 0.91 | 0.89 | 0.87 | 0.9 | 0.87 | 0.86 | 0.88 | 0.9 |
|  | Reproduction output | [dB] | 5.3 | 5.1 | 4.1 | 3.9 | 3.2 | 3.8 | 4 | 3.7 |
|  | CNR | [dB] | 4.9 | 4.7 | 4.3 | 4.6 | 2.9 | 3.3 | 3.5 | 3.5 |

AH: Acicular hematite
GH: Granulated hematite
Carbon: Carbon black
(*)Weight ratio of the granulated powder to the nonmagnetic powder

TABLE 4

|  |  |  | Comp. Ex. 5 | Comp. Ex. 6 | Comp. Ex. 7 |
|---|---|---|---|---|---|
| Thickness | Upper layer | [μm] | 0.5 | 0.05 | 0.05 |
|  | Lower layer D | [μm] | 2 | 0.3 | 2 |
| Acicular powder of lower layer | Kinds |  | AH | GH | AH |
|  | Length of major axis L | [μm] | 0.25 | 0.1 | 0.12 |
|  | Acicular ratio |  | 7.7 | 1 | 6 |
|  | L/D |  | 0.13 | 0.33 | 0.06 |
|  | Average angle |  | 48 | — | 43 |
|  | Number of particles constituting a bundle |  | None | None | 2 |
| Powder of lower layer | Kinds |  | Carbon | Carbon | Carbon |
|  | Average particle size | [nm] | 20 | 16 | 16 |
|  | Oil absorption amount | [ml/100 g] | 495 | 80 | 80 |
|  | Content ratio(*) |  | 3:97 | 20:80 | 20:80 |
| Prucedure | Smoothig process |  | None | Used | None |
|  | Kneader |  | None** | Used | Used |
|  | Dispersing time | Time | 20 | 6 | 20 |
| Evaluation results | Ra | [nm] | 3.7 | 4.5 | 3.1 |
|  | SQ |  | 0.79 | 0.81 | 0.82 |
|  | Reproduction output | [dB] | 0 | −0.8 | 1.2 |
|  | CNR | [dB] | 0 | −1 | 0.7 |

AH: Acicular hematite
GH: Granulated hematite
Carbon: Carbon black
(*)Weight ratio of the granulated powder to the nonmagnetic powder
**High speed mixer Explanation of Examples 12–20 and Comparative Examples 5–7

Comparative Example 5 was used as a standard (0 dB) for electromagnetic characteristics. A videotape of Comparative Example 1 was manufactured by the same procedures as those of Sample 5 in U.S. Pat. No. 5,612,122 excepting that a magnetic powder in the magnetic upper layer is different. Whether or not it was effective was judged based on whether the C/N ratio was improved to 3 dB or higher (generally, one digit influence to an error rate with respect to 2 dB). In the table, "AH" refers to an acicular hematite, "carbon" refers to carbon black, and "GH" refers to a granulated hematite.

Example 12 was an example of the present invention additionally satisfying all requirements in the preferred embodiments (1) to (5) mentioned above (see pages 2–3). The C/N ratio was improved to 4.9 dB compared with that of Comparative Example 5.

Example 13 was also an example of the present invention additionally satisfying all requirements in the preferred embodiments (1) to (5), mentioned above. Provided that the thickness of the lower layer was close to the upper limit described in the preferred embodiment (1) and the length of the major axis of the nonmagnetic powder contained in the lower layer was close to the upper limit described in the preferred embodiment (2). The C/N ratio of 4.7 dB was gained which is slightly inferior than that of Example 12 but is almost equivalent to that of Example 12.

Example 14 was the example in which a nonmagnetic powder has two consisting particles having a bundled formation with extending a dispersing time of the lower layer from 6 minutes to 10 minutes. The number of the bundled particles is outside of the range preferable in the present invention. Due to the orientation property of the magnetic material, which is slightly lowered compared with those of Examples 12 and 13, the C/N ratio was 4.34 dB that was lower than those of these Examples.

Example 15 was the example in which the thickness of the lower layer was close to the upper limit of the present invention, and the carbon content rate of the lower layer is high (30:70). Due to the deterioration of the orientation property and the surface property to some extent, the C/N ratio was 4.1 dB that was lower than those of Examples 12 and 13.

Example 16 was the example in which the thickness of the magnetic layer was thin of 0.03 μm, and the carbon content rate of the lower layer was low (5:95). Due to the thin magnetic layer in spite of good orientation property, the magnetization amount and the output were lowered. However, the C/R ratio was high of 4.6 dB.

Example 17 was the example in which the lower layer was thick of 0.7 μm, and an orientation angle of the granulated powder of the lower layer was large of 29 degrees. Due to the degradation of the surface property because of the Ra of 3.2 nm, the C/R ratio was 2.9 dB that was lowered.

Example 18 was the same example as Example 12 except for using titanium oxide having an average primary particle size of 35 nm as a granulated powder to the lower layer. The C/N ratio was 3.3 dB that was lower than that of Example 12.

Example 19 was the same example as Example 12 except for using a granulated hematite having an average primary particle size of 20 nm as a granulated powder to the lower layer. The C/N ratio was 3.5 dB that was slightly lower than that of Example 12.

The C/N ratio of Examples 18 and 19 were slightly lower because the calendering molding effect is lower compared with that of the case using. carbon described in the preferred. embodiment (4) as a granulated powder added to the lower layer.

Example 20 was the same example as Example 12 except for not adding a granulated particle to the lower layer. Due to the lower layer not containing a granulated powder, the calendering molding effect is poor. The surface property tends to be inferior because of the Ra of 3.7 nm. The C/N ratio was 3.5 dB that is lower.

Comparative Example 6 was the example in which a granulated hematite was used in the lower layer instead of the acicular nonmagnetic powder in the case of Example 12. The C/N ratio was −1 dB and the smoothing and orientation improvement due to the acicular powder could not be gained.

Comparative Example 7 was the same example as Example 12 except for the thickness of the lower layer being too thick thereby the L/D being lower than the lower limit of the present invention (claim 1). Smoothing was not provided and an orientation angle of the powder in the lower layer was large of 43 degrees. The C/N ratio was 0.7 dB and the output was insufficient.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A magnetic recording medium comprising, on a flexible nonmagnetic support, at least a nonmagnetic layer containing a nonmagnetic powder and a binder and a magnetic layer containing a ferromagnetic powder and a binder on the nonmagnetic layer, characterized in that said magnetic layer has an average thickness in the range of 0.01 to 0.3 μm, said nonmagnetic powder has an acicular shape, and the ratio of a mean length, L, of the major axis of said nonmagnetic powder to an average thickness, D, of said nonmagnetic layer satisfies the relationship of $1/10 \leq L/D \leq 2$, and wherein one of the surfaces of said flexible nonmagnetic support, on which a nonmagnetic layer and a magnetic layer are provided, has, according to the surface roughness spectrum measured with an atomic force microscope (AFM), a power spectrum density of roughness (PSD) equal to or less than 0.5 nm$^2$ in the wavelength of from 1 to 5 μm and PSD in the range of 0.02 to 0.5 nm$^2$ in the wavelength of from 0.5 μm or higher to less than 1 μm.

2. The magnetic recording medium according to claim 1, wherein the thickness of said nonmagnetic layer is less than 0.5 μm.

3. The magnetic recording medium according to claim 1, wherein the mean value, d, of the thickness of the magnetic layer is in the range of 0.03 to 0.07 μm.

4. The magnetic recording medium according to claim 1, wherein the relationship between the standard deviation, σ, in the thickness of the magnetic layer and the mean value, d, of the thickness of the magnetic layer (σ/d) is equal to or less than 0.5.

5. The magnetic recording medium according to claim 1, wherein the residual magnetization amount of the magnetic layer ranges from 0.0005 to 0.005 emu/cm$^2$.

6. The magnetic recording medium according to claim 1, wherein the coercive force, Hc, of the magnetic layer ranges from 2000 to 3000 Oe.

7. The magnetic recording medium according to claim 1, wherein the length, L, of the major axis of the nonmagnetic powder with respect to the thickness, D, of the lower layer is $1/8 \leq L/D \leq 1.5$.

8. The magnetic recording medium according to claim 1, wherein the length, L, of the major axis of the nonmagnetic powder with respect to the thickness, D, of the lower layer is $1/5 \leq L/D \leq 1$.

9. The magnetic recording medium according to claim 1, wherein the mean length of the major axis of the nonmagnetic powder is equal to or less than 0.15 μm and the acicular ratio of the nonmagnetic powder is from 3 to 10.

10. The magnetic recording medium according to claim 1, wherein the major axis of the acicular nonmagnetic powder in the nonmagnetic layer inclines in the angle equal to or less than 30 degrees.

11. The magnetic recording medium according to claim 1, wherein the magnetic layer contains carbon black.

12. The magnetic,recording medium according to claim 1, wherein the magnetic layer contains an abrasive.

13. The magnetic recording medium according to claim 1, wherein the thickness of the nonmagnetic layer is 0.02 to 0.5 μm.

14. The magnetic recording medium according to claim 1, wherein the surface of the magnetic layer has a power spectrum density of roughness (PSD) measured with an atomic force microscope (AMF) in the wavelength of 1 to 5 μm being equal to or less than 0.2 nm$^2$ and the PSD in the wavelength of 0.5 μm or higher to less than 1.0 μm being from 0.02 to 0.1 nm$^2$.

15. The magnetic recording medium according to claim 1, wherein said nonmagnetic powder has a mean length of the major axis equal to or less than 50 nm and an acicular ratio in the range of 2 to 20.

16. The magnetic recording medium according to claim 15, wherein said nonmagnetic layer further contains granulated particles having an average primary particle diameter equal to or less than 50 nm and the content ratio of said granulated particles to said acicular nonmagnetic powder is in the range of from 5:95 to 40:60.

17. The magnetic recording medium according to claim 16, wherein said granulated particles are carbon black having an average primary particle diameter equal to or less than 30 nm and an oil absorption amount equal to or less than 200 ml/100 g.

* * * * *